(12) United States Patent
Oku et al.

(10) Patent No.: US 7,605,281 B2
(45) Date of Patent: Oct. 20, 2009

(54) METHOD OF PRODUCTION OF FATTY ACID ALKYL ESTERS AND/OR GLYCERINE AND FATTY ACID ALKYL ESTER-CONTAINING COMPOSITION

(75) Inventors: Tomoharu Oku, Chiba (JP); Masanori Nonoguchi, Ibaraki (JP); Toshimitsu Moriguchi, Ibaraki (JP)

(73) Assignee: Nippon Shokubai Co., Ltd., Osaka-Shi (JP)

( * ) Notice: Subject to any disclaimer, the term of this patent is extended or adjusted under 35 U.S.C. 154(b) by 0 days.

(21) Appl. No.: 10/569,979

(22) PCT Filed: Aug. 30, 2004

(86) PCT No.: PCT/JP2004/012876

§ 371 (c)(1),
(2), (4) Date: Jan. 10, 2007

(87) PCT Pub. No.: WO2005/021697

PCT Pub. Date: Mar. 10, 2005

(65) Prior Publication Data

US 2007/0167642 A1    Jul. 19, 2007

(30) Foreign Application Priority Data

Aug. 29, 2003  (JP) .............................. 2003-307589
Dec. 16, 2003  (JP) .............................. 2003-418666
Dec. 18, 2003  (JP) .............................. 2003-421448
Dec. 24, 2003  (JP) .............................. 2003-427471

(51) Int. Cl.
*C11C 3/00* (2006.01)
(52) U.S. Cl. ...................... 554/170; 554/169
(58) Field of Classification Search ............... 554/30, 554/77, 165, 167, 169, 170
See application file for complete search history.

(56) References Cited

U.S. PATENT DOCUMENTS 3,925,463 A  *  12/1975  Ferlazzo et al. ............. 560/208

(Continued)

FOREIGN PATENT DOCUMENTS

CN    1408701    9/2003

(Continued)

OTHER PUBLICATIONS

Mitsubishi Rayon Co., Ltd, Catalyst for producing methacrolein and methacrylic acid, 2001, JP 2001029790 A (English abstract).*

(Continued)

*Primary Examiner*—Porfirio Nazario-Gonzalez
*Assistant Examiner*—Yate' K Cutliff
(74) *Attorney, Agent, or Firm*—Connolly Bove Lodge & Hutz LLP

(57) ABSTRACT

The method of producing fatty acid alkyl esters and/or glycerine of the present invention is a method of producing high-purity fatty acid alkyl esters and/or glycerine advantageously from the energy viewpoint while reducing the energy consumption of the production, and the products can be used in various fields of application, for example in biodiesel fuels, foods, cosmetics and pharmaceuticals.

The above-mentioned method of producing fatty acid alkyl esters and/or glycerine by reacting a fat or oil with an alcohol using an insoluble solid catalyst in a reaction apparatus comprising at least one reactor, comprises (a) a step of obtaining low-boiling components removed liquid by removing low-boiling components or fraction from an effluent liquid of a reactor and (b) a step of separating the fatty acid alkyl esters and glycerine from the low-boiling components removed liquid, wherein an eluted active metal component of the insoluble solid catalyst in the effluent liquid of a reactor amounts to a level not higher than 1,000 ppm.

20 Claims, 2 Drawing Sheets

U.S. PATENT DOCUMENTS

| | | | |
|---|---|---|---|
| 5,508,457 A * | 4/1996 | Bayense et al. | 554/169 |
| 5,908,946 A * | 6/1999 | Stern et al. | 554/167 |
| 6,090,959 A | 7/2000 | Hirano et al. | |
| 6,407,269 B2 | 6/2002 | Kaita et al. | |
| 6,812,359 B2 * | 11/2004 | Goto et al. | 554/170 |
| 6,887,283 B1 * | 5/2005 | Ginosar et al. | 44/388 |
| 2001/0053860 A1 | 12/2001 | Peter et al. | |
| 2004/0034244 A1 | 2/2004 | Bournay et al. | |
| 2004/0087809 A1 | 5/2004 | Nakayama et al. | |
| 2004/0186307 A1 | 9/2004 | Piacentini et al. | |
| 2005/0020843 A1 | 1/2005 | Peter et al. | |
| 2005/0113588 A1 | 5/2005 | Hillion et al. | |
| 2005/0261509 A1 | 11/2005 | Delfort et al. | |
| 2005/0266139 A1 | 12/2005 | Lacome et al. | |
| 2007/0161809 A1 | 7/2007 | Piacentini et al. | |

FOREIGN PATENT DOCUMENTS

| | | |
|---|---|---|
| DE | 19950593 | 5/2001 |
| DE | 10200528 | 7/2003 |
| EP | 0 198 243 B1 | 10/1986 |
| EP | 0623581 | 11/1994 |
| EP | 1126011 | 8/2001 |
| EP | 1298192 | 4/2003 |
| EP | 1352893 A1 | 10/2003 |
| EP | 1380637 A1 | 1/2004 |
| EP | 1460124 A1 | 9/2004 |
| EP | 1505048 A1 | 2/2005 |
| EP | 1593732 A1 | 11/2005 |
| FR | 2735770 A1 | 12/1996 |
| GB | 634411 | 3/1950 |
| GB | 970431 | 9/1964 |
| GB | 2174697 A | 11/1986 |
| GB | 2174697 A * | 11/1986 |
| JP | 61-236749 A | 10/1986 |
| JP | 61-254255 | 11/1986 |
| JP | SHO-62-218495 | 9/1987 |
| JP | 06-313188 | 11/1994 |
| JP | 07-173103 | 7/1995 |
| JP | 8-198808 A | 8/1996 |
| JP | 2000-44984 A | 2/2000 |
| JP | 2000-342973 A | 12/2000 |
| JP | 2001-031991 | 2/2001 |
| JP | 2001029790 A * | 2/2001 |
| JP | 2002-241787 A | 8/2002 |
| JP | 2002-294277 | 10/2002 |
| JP | 2003-104935 | 4/2003 |
| JP | 2003523452 | 8/2003 |
| JP | 2005-177722 | 7/2005 |
| WO | 0005327 A1 | 2/2000 |
| WO | WO-01/60954 A1 | 8/2001 |
| WO | WO-02/081607 | 10/2002 |
| WO | WO-03/004588 A2 | 1/2003 |
| WO | WO 03/040268 | 5/2003 |

OTHER PUBLICATIONS

Siler-Marinkovic et al., "Transesterification of sunflower oil in situ" *Fuel* vol. 77, No. 12, pp. 1389-1391, Elsevier Science Ltd. 1998.

S. Gryglewicz, 1999. "Rapeseed oil methyl esters preparation using heterogeneous catalysts." *Biosource Technology* 70, 249-253.

Boocock et al, 1998. "Fast Formation of High-Purity Methyl Esters from Vegtable Oils," *JAOCS* vol. 75. No. 9, 1167-1172.

Antolin et al., 2002. "Optimisation of biodiesel production by sunflower oil transesterification." *Biosource Technology* 83, 111-114.

Mittelbach, 1996. "Diesel Fuel Derived from Vegtable Oils, VI: Specifications and Quality Control of Biodiesel". *Biosource Technology* 36 (1996) 7-11.

Peterson et al., 1984. "Rapeseed Oil Transesterification by Heterogeneous Catalysis" JAOCS, vol. 61, No. 10, pp. 1593-1597.

Suppes et al., 2001. "Calcium Carbonate Catalyzed Alcoholysis of Fats and Oils" *JAOCS*, vol. 78, No. 2, pp. 139-145.

Abreu et al., 2003. "New Metal Catalysts for Soybean Oil Transesterification," *JAOCS*, vol. 80, No. 6.

Leclercq et al., 2001. "Transesterification of Rapeseed Oil in the Presence of Basic Zeolites and Related Solid Catalysts." *JAOCS*, vol. 78, No. 11, pp. 1161-1165.

Supplementary European Search Report dated Jul. 3, 2009.

* cited by examiner

METHOD OF PRODUCTION OF FATTY ACID ALKYL ESTERS AND/OR GLYCERINE AND FATTY ACID ALKYL ESTER-CONTAINING COMPOSITION

This application is a National Stage of PCT/JP2004/012876 filed Aug. 30, 2004 which in turn claims priority from Japanese Applications, 2003-307589 filed Aug. 29, 2003; 2003-418666 filed Dec. 16, 2003; 2003-421448 filed Dec. 18, 2003; and 2003-427471 filed Dec. 24, 2003, respectively.

TECHNICAL FIELD

The present invention relates to a method of producing fatty acid alkyl esters and/or glycerine and to a fatty acid alkyl esters-containing composition. More precisely, it relates to a method of producing fatty acid alkyl esters and/or glycerine useful in such fields as fuels, foods, cosmetics and pharmaceuticals, and to a fatty acid alkyl esters-containing composition suited for use in biodiesel fuel or as a surfactant intermediate.

BACKGROUND ART

Those fatty acid esters derived from vegetable fat and oil are used as a cooking oil and, in addition, they are used in such fields as cosmetics and pharmaceuticals. In recent years, attention has been paid to them as additives to fuels such as light oil. For example, they are added as vegetable-derived biodiesel fuel to light oil at addition levels of several percent for the purpose of reducing the emission of $CO_2$. Glycerine is mainly used in such various fields as a raw material for the production of nitroglycerin and is further used as a raw material for alkyd resins, pharmaceuticals, foods and printing inks and cosmetics. It is known that a method of producing such fatty acid esters and/or glycerine by transesterification of triglyceride, which is main component of fats and oils, with a lower alkyl alcohol.

In carrying out such a production method on a commercial scale, a homogenous alkali catalyst is generally used. This, however, makes it necessary to carry out a complicated step of separation and/or removing the catalyst. Further, the alkali catalyst causes saponification of a free fatty acid contained in a fat/oil to form soaps as byproducts, whereby it becomes necessary to carry out a step of washing with large amounts of water and, in addition, the yield of alkyl esters decreases due to the emulsifying effect of the soaps and, in certain instances, the subsequent glycerine purification process becomes complicated.

Concerning the conventional method of catalytic transesterification of fatty acid glycerides (a fat/oil), Japanese Kokai Publication S61-254255 discloses a method comprising reacting fatty acid glycerides with a lower alcohol and then separating the free glycerine wherein sodium carbonate and/or sodium hydrogencarbonate is used as a heterogeneous solid catalyst. It is described that, in carrying out this method, the alcohol is evaporated from the reaction mixture and then the layer containing the free glycerine is separated and removed. It is also described that when the reaction is carried out continuously, the free alcohol included in the reaction mixture is partly evaporated and then the heavy glycerine phase is separated and removed by phase separation, part of the light ester phase is returned to the transesterification step as a recycling stream and the evaporated alcohol and fresh portions of the reactants are simultaneously introduced into the same step. However, the transesterification method using such a catalyst has problems, namely the alkali catalyst may be converted into a soap when a free fatty acid coexists in the raw material fat/oil, or the catalyst may be eluted by the water contained in the fat/oil or, when the active species of the catalyst is eluted, the reverse reaction may proceed in the step of evaporation of the alcohol, resulting in decreases in yield. Therefore, there is room for contrivance for enabling the production of high-purity fatty acid lower alkyl esters and glycerine in high efficiency, by prolonging the catalyst lifetime and/or suppressing the reverse reaction resulted from the elution of the active species of a solid catalyst to thereby carry out the transesterification reaction with high efficiency.

Further, regarding a continuous producing method of fatty acid esters and glycerine, Japanese Kokai Publication 2001-31991 discloses that a fat/oil and an alcohol are preheated and reacted in the absence of catalysts where the preheating temperature and reaction temperature are not lower than the critical temperature of the alcohol and the preheating pressure is not lower than 0.7 MPa, and then the alcohol is evaporated from the reaction mixture obtained, follow by light liquid phase containing fatty acid esters and heavy liquid phase containing glycerine are separated from each other. There is no description of the use of a catalyst in carrying out this method; the reaction is carried out at high temperatures and under high pressure.

Furthermore, Japanese Kokai Publication 2003-104935 discloses a method of producing fatty acid esters which comprises reacting a fat/oil with a monohydric alcohol under supercritical condition of the alcohol, and feeding the reaction mixture containing the unreacted materials and/or intermediate products to a reactor. In this process as well, the reaction is carried out at high temperatures and under high pressure. It is described, in the examples, that a methanol slurry containing a $MnO_2$ powder suspended therein is fed and that the monohydric alcohol is fed in an amount of about 17 times the theoretical amount to be fed. However, there is still room for contrivance for rendering these methods capable of producing high-purity fatty acid lower alkyl esters and/or glycerine at low cost by improving the conversion and reducing the energy consumption of the production process in an advantageous manner from the energy viewpoint.

Further, Japanese Kokai Publication 2002-294277 discloses a method of producing a lower alkyl ester by transesterification of a fat/oil with a lower alcohol in the presence of a catalyst, which comprises using a catalyst containing a composite metal oxide having a perovskite-type structure. This composite metal oxide containing a perovskite-type structure is highly basic and preferably contains a cesium (Cs) compound. The cesium (Cs)-containing one includes Ca—, Sr— and/or Ba-containing ones. However, when such composite metal oxides having a perovskite-type structure are used, high reaction temperature is required, since pure perovskite is low in activity. High reaction temperatures allow the elution of the active ingredients of the catalysts. When calcium oxide and/or a cesium component occurs externally to the perovskite crystal lattices, the activity increases and the catalyst allows the reaction to proceed even at ordinary pressure. However, a problem arises; such active metal components as Ca and Cs are eluted into the liquid reaction mixture in large quantities.

SUMMARY OF THE INVENTION

It is an object of the present invention, which has been made in view of the above-discussed state of the art, to provide a method by which high-purity fatty acid alkyl esters and/or glycerine can be produced advantageously from the energy viewpoint while reducing the energy consumption of the production system in the production as well as a fatty acid alkyl esters-containing composition useful for a various way as a biodiesel fuel or a surfactant intermediate, for instance.

The present inventors made various investigations concerning how to produce fatty acid alkyl esters and/or glycerine and, as a result, found that the use of an insoluble solid catalyst favorably results in an increased fatty acid alkyl esters content in the ester phase, hence in reductions in purification cost, improvements in isolated yield, and omission of the steps of neutralization and acid precipitation (recovery of free fatty acids or removal of soap components). Further, they found that high-purity fatty acid alkyl esters and/or glycerine can be produced advantageously from the energy viewpoint when the mode of production is such that the fatty acid alkyl esters and/or glycerine are produced using a reaction apparatus comprising at least one or more reactors and, after removal of low-boiling components or fraction from the effluent from the last reactor, the fatty acid alkyl esters and glycerine are separated from the low-boiling components removed liquid and/or the elution of the active metal component from the insoluble solid catalyst in the effluent liquid from the reactor is restricted to a certain level. Thus, they came to realize that the above object can be skillfully accomplished in the above manner. Such and other findings have now led to completion of the present invention.

In such a production process, high-purity fatty acid alkyl esters and glycerine can be produced advantageously from the energy viewpoint, for example (1) in the case of carrying out the reaction in one step by using single reactor, the alcohol in an amount within a specific range and/or the purification residue fraction is recycled as one of the raw materials or (2) in the case of carrying out the reaction in two or more steps by using plural reactors in series, the ester phase separated from the reaction mixture after the reaction in the preceding step is used as a raw material for the reaction in the next reaction step to thereby drive the esterification and transesterification reactions to completion. Further, the desired products can be produced advantageously from the energy viewpoint while reducing the energy consumption of the production when a selection is made as to whether the production is carried out in one reaction step or in two or more reaction steps according to the insoluble solid catalyst species, the raw material fat/oil and alcohol species, and the reaction conditions. Thus, an operation mode more advantageous from the production viewpoint can be selected from (1) the operation mode in which the reaction is carried out in one step to thereby reduce the energy consumption of the production and the ester phase and glycerine phase finally obtained are distilled and purified and (2) the operation mode in which the reaction is carried out in multiple steps advantageously from the chemical equilibrium viewpoint while separating the by-product water generated from esterification and the product glycerine resulting from transesterification in the manner of phase separation to thereby improve the conversion and simplify the purification process.

Further, in the process of completion of the present invention, it was found that a catalyst containing, as an essential constituent, at least one metal element selected from the group consisting of the metal elements belonging to the Group 4 and the Group 5 in the periodic table is capable of catalyzing esterification and transesterification simultaneously, and unaffected by a mineral acid or metal components contained in a fat and oil and, further, capable of producing such effects as the nonoccurrence of decomposition of the alcohol, and that the use of such a catalyst makes it possible to carry out the reaction efficiently at high activity levels and under mild conditions and thus produce the desired products advantageously from the energy viewpoint while reducing the energy consumption of the production. Furthermore, it was found that when such an insoluble solid catalyst is used, the active metal components are eluted little, the catalyst life-time is sufficiently long, the catalyst recovery step can be much simplified as compared with the current processes using a homogeneous catalyst, and the catalyst can be used repeatedly for the reaction, so that the desired products can be produced advantageously from the energy viewpoint while reducing the energy consumption of the production.

Thus, the present invention provides a method of producing a fatty acid alkyl esters and/or glycerine by reacting a fat or oil with an alcohol using an insoluble solid catalyst in a reaction apparatus comprising at least one reactor, comprising:

(a) a step of obtaining low-boiling components removed liquid by removing low-boiling components or fraction from an effluent of the last reactor and (b) a step of separating the fatty acid alkyl esters and glycerine from the low-boiling components removed liquid, wherein an eluted. active metal component of the insoluble solid catalyst in the effluent liquid of the reactor amounts to a level not higher than 1,000 ppm.

DETAILED DISCLOSURE OF THE INVENTION

In the following, the present invention is described in detail.

In accordance with the present invention, a fat or oil is reacted with an alcohol using an insoluble solid catalyst. In the case of producing fatty acid alkyl esters in addition to the effects mentioned above, the fatty acid alkyl esters content in the ester phase is improved due to the improvement in conversion and in recovery of the fatty acid alkyl esters from the glycerine phase, so that the purification cost can be reduced. Further, unlike the conventional methods of production using a homogeneous catalyst, the step of catalyst removal by washing with water becomes unnecessary; in this respect, the method of the invention is an advantageous one. In the case of production of glycerine as well, recovery of glycerine from the ester phase is improved and high concentration and high purity levels of glycerine in the glycerine phase can be attained because of no necessity of diluting with water, so that the purification cost can be reduced. Further, while, in the conventional production processes using a homogeneous catalyst, the steps of washing the ester phase with water or/and neutralizing the ester phase are carried out in some instances for catalyst removal and glycerine recovery and, therefore, the glycerine phase has a glycerine concentration of 15 to 50% by mass and contains a large amount of a salt, it is possible, in accordance with the present invention according to which an insoluble heterogeneous catalyst is used, to obtain a salt-free glycerine phase with a higher glycerine concentration and thus produce high-purity glycerine at low cost. Furthermore, in the case of simultaneous production of fatty acid alkyl esters and glycerine, it becomes possible to produce the respective effects simultaneously. In addition, the ester or fatty acid obtainable by the present invention is generally a mixture, but they may also be single compounds.

In the practice of the invention, in the case of the production is carried out using a reaction apparatus constituted of one reactor, the reaction of a fat/oil with an alcohol is carried out in one stage, and low-boiling components or fraction mainly comprising the alcohol is removed from the reaction mixture after the one-stage reaction (an effluent from the last reactor)

to give the low-boiling components removed liquid. Thereafter, fatty acid alkyl esters and glycerine are separated from the low-boiling components removed liquid obtained by removing the low-boiling component or fraction from effluent of the last reactor. That is, in the present invention, after the step comprising removing the low-boiling components or fraction from the reaction mixture after the one-stage reaction in the absence of a catalyst, a step comprising phase separation of the ester phase and glycerine phase is included.

In the case of the production is carried out using a reaction apparatus comprising two or more reactors, mention may be made of (1) the mode in which the reactors are connected in parallel and/or (2) the mode in which the reactors are connected in series. In the mode (1), the operation is the same as in the above-mentioned case in which the production is carried out using a reaction apparatus comprising one reactor, and the reaction of a fat/oil with an alcohol is carried out in one step in each of the plurality of reactor. In the mode (2), the reaction of a fat/oil with an alcohol is carried out in two or more stages, low-boiling components or fraction is removed from the effluent of the last reaction step, and the fatty acid alkyl esters and glycerine are separated from the low-boiling components removed liquid obtained. That is, in the present invention, after the step comprising removing the low-boiling components or fraction from the reaction mixture of the last reaction step in the absence of a catalyst, a step comprising phase separation of the ester phase and glycerine phase is included.

In a preferred mode of carrying out the above-mentioned method of production, the glyceride and free fatty acids separated and removed from the product fatty acid alkyl esters and glycerine are reused together with the raw material fat or oil. By separating/recovering the unreacted raw material and intermediate glyceride and reusing them in such a manner, it becomes possible to cut down the production cost. In a more preferred mode of procedure, the step of obtaining the low-boiling components removed liquid by removing the low-boiling components or fraction from the effluent liquid of a last reactor is carried out in the absence of the catalyst and/or the step of separating the fatty acid alkyl esters and glycerine from the low-boiling components removed liquid comprises a step of phase separation of the low-boiling components removed liquid into an ester phase and a glycerine phase. By removing the low-boiling components or fraction in the absence of the catalyst in such a manner, it becomes possible to inhibit the reverse transesterification of the fatty acid alkyl esters with glycerine from occurring and, further, the mutual solubility between the upper layer mainly comprising the fatty acid alkyl esters and the lower layer mainly comprising glycerine decreases and the separation of the fatty acid alkyl esters and glycerine from each other is thereby improved and, in addition, the separation/recovery of glyceride and free fatty acids can be conducted easily by allowing phase separation into the ester phase and glycerine phase following low-boiling components or fraction removal. As a result, it becomes possible to produce high-purity fatty acid alkyl esters and/or glycerine advantageously from the energy viewpoint. The phase separation into the ester phase and glycerine phase is preferably caused by allowing to stand, centrifugation, or using a settle or liquid cyclone, and others. It is also possible to employ the mode in which it is allowed that the effluent from the last reactor is separated into two phases of the ester phase and glycerine phase and a low-boiling component or fraction is removed from each phase in the absence of the catalyst.

"The absence of the catalyst" so referred to above means that the content of the insoluble solid catalyst in the effluent from the reactor is almost nil and the total concentration of the active metal component eluted from said catalyst into the effluent from the reactor is not higher than 1,000 ppm. The eluted active metal component means the metal component derived from the insoluble solid catalyst eluted into the reaction mixture and capable of serving as a homogeneous catalyst showing catalytic activity in transesterification and/or esterification under operation conditions.

The concentration of the active metal component in the reaction mixture eluted from the catalyst can be determined by subjecting the effluent from the reactor in the solution form to X ray fluorescence analysis (XRF). When further smaller elution is determined, inductively coupled plasma (ICP) emission spectrometry is used.

The ester phase obtained in the step of phase separation of the low-boiling components removed liquid into the ester phase and glycerine phase preferably contains not less than 75 parts by weight of fatty acid alkyl esters per 100 parts by weight of the ester phase. At levels lower than 75 parts by weight, the energy consumption of the production system may not be decreased to a satisfactory extent. More preferably the content level is not lower than 85 parts by weight and still more preferably not lower than 90 parts by weight.

The glycerine phase obtained in the step of phase separation of the low-boiling components removed liquid preferably contains not less than 70 parts by weight of glycerine per 100 parts by weight of the glycerine phase. At levels lower than 70 parts by weight, the energy consumption of the production system may not be decreased to a satisfactory extent. More preferably the content level is not lower than 80 parts by weight and still more preferably not lower than 85 parts by weight.

In accordance with the present invention, the concentration of the active metal component of the insoluble solid catalyst, which is contained in an effluent from the last reactor, is not more than 1,000 ppm. At levels exceeding 1,000 ppm, it will become impossible to inhibit the reverse reactions to a satisfactory extent, hence it will be impossible to reduce the energy consumption of the production to a satisfactory extent. The limit level is preferably not higher than 800 ppm, more preferably not higher than 600 ppm and still more preferably not higher than 300 ppm. Most preferably, the effluent liquid from the last reactor should be substantially free of any active metal component of the insoluble solid catalyst.

In the above-mentioned case of production in two or more reaction stages, the mode is preferred which includes a step of reaction of the ester phase separated from the effluent of the reactor with the alcohol in the next reactor in the presence of the insoluble solid catalyst. Thus, preferably, the ester phase is separated and recovered from the liquid reaction mixture resulting from the preceding reaction stage and the reaction in the next stage is carried out using the ester phase recovered and the alcohol as reactants in the presence of the insoluble solid catalyst. More preferred is the mode which includes the step of removing low-boiling components or fraction in the absence of the catalyst prior to the step of separation/recovery of the ester phase from the reaction liquid after the preceding reaction stage. In such a mode, the separation of the ester phase and glycerine phase from each other can be improved.

In the above case, when two successive reaction stages are taken into consideration, the preceding reaction stage means the reaction stage which is carried out first, while the next or succeeding reaction stage means the reaction stage which is carried out later. Thus, in the case of two-stage reactions, the first stage is the preceding reaction stage and the second stage is the next or succeeding reaction stage. In the case of three-stage reactions, when the first and second reaction stages are taken into consideration, the first reaction stage is the preceding reaction stage and the second stage is the next or succeeding reaction stage and, when the second and third reaction stages are taken into consideration, the second stage is the preceding reaction stage and the third stage is the next or succeeding reaction stage.

By employing such a multistage reaction process, it becomes possible to drive the esterification and transesterification reactions almost to completion and, thus, it becomes possible to simplify the purification step to be carried out later. Further, when use is made of the mode which comprises phase separation of the reaction liquid obtained from the preceding reaction stage into an upper layer mainly comprising the desired esters and a lower layer mainly comprising glycerine and using the ester phase (upper layer liquid) as a raw material in the next reaction stage, not only the glycerine formed by the transesterification reaction but also the moisture contained in the raw material fat/oil and the water generated from the esterification of free fatty acids are distributed into the glycerine phase (lower layer) and thus removed out of the reaction system; this is favorable from the chemical equilibrium viewpoint and the purification cost can thus be reduced.

When the production is carried out in the above-mentioned manner of one-stage reaction, the amount of the alcohol to be fed for the reaction thereof with fat/oil is preferably 1 to 5 times the theoretical amount thereof to be fed. In amounts smaller than the theoretical amount, the fat/oil and alcohol may not react with each other to a satisfactory extent and, accordingly, the conversion may not be improved to a satisfactory extent. At levels higher than 5 times, the amount of the alcohol to be recovered and recycled increases, hence the energy consumption of the production may be not reduced to a satisfactory extent. The lower limit is more preferably 1.1 times, still more preferably 1.3 times and most preferably 1.5 times. The upper limit is more preferably 4.8 times, still more preferably 4.5 times and most preferably 4.0 times. A more preferred range is 1.1 to 4.8 times, still more preferably 1.3 to 4.5 times and most preferably 1.5 to 4.0 times.

When the production is carried out in the above-mentioned manner of multistage reaction, the amount of the alcohol to be fed for the reaction thereof with fat/oil in the case of production in two reaction stages, for instance, is preferably the same as that in the above-mentioned case of production in one reaction stage for the first reaction stage and, for the second reaction stage, the amount is preferably not smaller than the theoretical amount and not larger than 5 times the theoretical amount to be fed as calculated from the conversion in the first stage and/or the residual amounts of the glyceride and free fatty acids components. A range of 1.1 to 4.8 times is more preferred.

The theoretical amount of the alcohol to be fed, so referred to herein, means the number of moles of the alcohol which corresponds to the saponification value of the fat/oil and can be calculated as follows:

Theoretical feed amount (kg/h)=(molecular weight of alcohol)×[feed amount of fat/oil (kg/h)×saponification value (g KOH/kg fat/oil)/56100].

In the above-mentioned one-stage reaction, the yield of fatty acid alkyl esters is preferably not lower than 40%. When it is lower than 40%, it may become impossible to lower the purification cost to a satisfactory extent. More preferably, the yield is not lower than 60% and still more preferably not lower than 75%.

In the preceding reaction stage in carrying out the reaction in two or more stages, the yield of fatty acid alkyl esters is preferably not lower than 40%. When it is lower than 40%, the effect of reducing the energy consumption of the production may not be fully reduced. More preferably, the yield is not lower than 50% and still more preferably not lower than 60%. For fully producing the effects obtainable by carrying out the reaction in two or more stages, the yield is preferably not higher than 90%, more preferably not higher than 85%. In this case, the preceding reaction stage means the first reaction stage out of two or more reaction stages.

The yield of fatty acid alkyl esters so referred to herein, means the degree of conversion of the effective fatty acid components in the raw material fat/oil and can be calculated as follows:

Yield of fatty acid alkyl esters (%)=(total molar flow rate of fatty acid alkyl esters at the outlet of reactor/total molar flow rate of effective fatty acid components at the inlet of reactor)×100

The term "effective fatty acid components", so referred to herein, includes, within the meaning thereof, those components which can provide fatty acid alkyl esters according to the method of present invention and, specifically, it includes fatty acid triglycerides, diglycerides, monoglycerides, free fatty acids and fatty acid alkyl esters contained in the fat/oil as well as in the recycled raw material. That is, the molar flow rate of an effective fatty acid at the inlet of reactor can be calculated as follows:

Total molar flow rate of effective fatty acid components (mol/h)=[flow rate of raw materials at the inlet of reactor (g/h)×saponification value of raw materials at the inlet of reactor/56100].

In a preferred mode of carrying out the production method of the invention, it comprises a step of distillation purifying at least one of the ester phase and the glycerine phase obtained in the step of phase separation of the low-boiling component reduced liquid, wherein at least one of the purification residues is used as one of the raw materials for the reaction. Also preferred is the mode in which the alcohol is recovered from the low-boiling components or fraction distilled off and at least part of the recovered alcohol is used as a raw material. By employing such a mode or modes, it becomes possible to cut down the production cost to a satisfactory extent. The process may comprise one or more steps other than the steps mentioned above and, further, includes not only the case where both the one reaction stage mode and two or more reaction stage mode mentioned above are carried out as selected appropriately but also the case where one of the both modes alone is carried out.

For the distillation of the ester phase and glycerine phase and for the recovery of the alcohol any of those methods known in the art may be appropriately employed, and the distillation and recovering temperatures can be properly selected according to such factors as the fatty acid alkyl esters species to be produced and the alcohol species to be recovered.

In cases where the alcohol is recovered from the low-boiling components or fraction distilled off as mentioned above and at least part of the recovered alcohol is used as a raw material, it is allowable to use at least part of the recovered alcohol as a raw material, and it is preferable to use all parts of the recovered alcohol as a raw material in the economical viewpoint. It is also desirable that the alcohol be purified by distillation, for instance, to remove impurities prior to reuse. When the alcohol to be reused as a raw material contains water, the yield of the fatty acid alkyl esters may decrease in some instances due to the progress of hydrolysis of the fatty acid alkyl esters in the reaction step. The water content in the alcohol is generally not lower than 0.05% and not higher than 5%, preferably not lower than 0.1% and not higher than 3%, more preferably not lower than 0.3% and not higher than 1.5%. As the water content decreases, the fatty acid alkyl esters can be obtained more advantageously from the equilibrium of hydrolysis viewpoint. At water content levels below 0.05%, however, much energy is required for the steps of recovery and purification of the alcohol hence the advantage from the energy viewpoint may not be fully obtained. At levels exceeding 5%, the amount of hydrolysis of the fatty acid alkyl esters into free fatty acids increases and not only the yields decreases but also a step of removing free fatty acids becomes necessary, hence the process may not be carried out in a satisfactorily advantageous manner from the commercial viewpoint.

As for the production mode in the practice of the invention, either the batch method or continuous flow method may be employed. The fixed bed flow method is preferred, among others. As the reactor to be used in such a production mode, there may be mentioned tubular reactor, stirring slurry reactor, and reaction kettle type ones, among others.

Preferred in the practice of the present invention is the mode in which a fixed bed reaction apparatus packed with the insoluble solid catalyst is used for a production and the fatty acid alkyl esters and/or glycerine is produced continuously. By employing such mode, the step of catalyst separation becomes unnecessary and it also becomes possible to carry out the production process on an industrial scale.

When such a fixed bed reaction apparatus as mentioned above is used, the average time of residence of the liquid reaction mixture in the reaction apparatus is preferably not shorter than 1 minute and not longer than 5 hours. A shorter time than 1 minute may be insufficient for allowing the reaction to proceed to a satisfactory extent, while a longer time than 5 hours may require a large-sized reaction apparatus. More preferably, the residence time is not shorter than 2 minutes and not longer than 4 hours, and still more preferably not shorter than 5 minutes and not longer than 3 hours.

In a preferred mode of carrying out the batch method mentioned above, the catalyst is added to a mixture system comprising the fat/oil and alcohol and, generally, the reaction time is preferably not shorter than 15 minutes and not longer than 30 hours and more preferably not shorter than 30 minutes and not longer than 20 hours, although the reaction time depends on the amount of the catalyst used and reaction temperature.

Now, referring to FIG. 1 and FIG. 2, some preferred modes of embodiment of the production method of the invention are described. It goes without saying that the present invention is not restricted to these modes.

FIG. 1 is a schematic representation of one of the preferred modes of carrying out the production process according to the present invention in one reaction stage using methanol as the alcohol. In such a mode, the raw material methanol is fed from a methanol reservoir 1 to a reactor 4 via a line 101, and the supply thereof is 1 to 5 times the theoretical one. A fat/oil is fed from a fat/oil reservoir 2, via a line 102, to a degumming reactor 3, where the fat/oil is deprived of such impurities as proteins and phospholipids, and then it is fed to the reactor 4 via a line 103. In the reactor 4, which is packed with an insoluble solid catalyst, the methanol and fat/oil react with each other. The liquid reaction mixture thus obtained contains methyl esters, glycerides, free fatty acids, methanol, glycerine and by-product water, among others, and the content of the eluted active metal component of the insoluble solid catalyst therein is not higher than 1,000 ppm. The liquid reaction mixture is fed from the bottom of the reactor 4 to a column 5 for stripping off a low-boiling fraction (a light ends column 5) via a line 104.

In the light ends column 5, the above liquid reaction mixture is deprived of low-boiling components or fraction comprising methanol and byproduct water, and the low-boiling components or fraction distilled off is sent to a methanol recovery column 6 through a line 106. The high-boiling fraction obtained by removal of the low-boiling components or fraction from the liquid reaction mixture (low-boiling component removed liquid) is sent to a separator 7 via a line 105. In the methanol recovery column 6, the low-boiling components or fraction is separated into methanol and byproduct water, and the methanol is fed to the reactor 4 via a line 109 and thus is reused as a reactant raw material.

In the separator 7, the high-boiling fraction is allowed to stand, whereby it undergoes phase separation into an ester phase and glycerine phase. The ester phase is sent to an ester purification column 8 via a line 107, while the glycerine phase is sent to a glycerine purification column 9 via a line 108.

In the ester purification column 8, the desired final product fatty acid alkyl esters are obtained by distillation through a line 110 while the purification residue is fed to the reactor 4 through a line 111 for reuse as a reactant raw material.

In the glycerine purification column 9, the desired final product glycerine is obtained by distillation through a line 112, and the purification residue is fed to the degumming reactor 3 via a line 113 and reutilized as a reactant raw material.

In another preferred mode of embodiment, the light ends column 5 is used also as the methanol recovery column and thus the methanol recovery column 6 is omitted, and the byproduct water is recovered at the bottom of the light ends column 5. In this case, the light ends column 5 is operated as a methanol recovery column, and the byproduct water may be removed, for example, in a dehydration column additionally disposed between the glycerine purification column 9 and separator 7 or, without adding any dehydration column, the byproduct water may be removed from the top of the glycerine purification column 9 while purified glycerine may be obtained by side-cut or partial condensation at the top of the column 9.

FIG. 2 is a schematic representation of a preferred mode of practicing the production process according to the invention in which the production is carried out in two reaction stages using methanol as the alcohol. In the figure, "FAME" stands for fatty acid methyl esters.

In such a mode, the raw material methanol is fed from a methanol reservoir 10 to a first stage reactor 13 via a line 201. A fat/oil is fed from a fat/oil reservoir 11, via a line 202, to a degumming reactor 12, where it is deprived of impurities. The fat/oil is then fed to the 20 first stage reactor 13 via a line 203. The methanol and fat/oil react with each other in the first stage reactor 13, which is packed with an insoluble solid catalyst. The liquid reaction mixture obtained contains methyl esters, glycerides, free fatty acids, methanol, glycerine and water, among others, and is sent from the bottom of the first stage reactor 13 to a separator 14 via a line 204.

In the separator 14, the reaction mixture is allowed to stand, whereupon it undergoes phase separation into an ester phase and glycerine phase. The ester phase is sent to a second stage reactor 15 via a line 205. This ester phase contains fatty acid alkyl esters, glycerides, free fatty acids and methanol. On the other hand, the glycerine phase containing glycerine, methanol and byproduct water is sent to a line 207 via a line 206.

In the second stage reactor 15, the ester phase derived from the separator 14 reacts with fresh methanol supplied from the methanol reservoir 10 via the line 201.

The liquid reaction mixture is sent from the bottom of the second stage reactor 15 to a light ends column 16 via the line 207, together with the glycerine phase derived from the separator 14 mentioned above.

In the light ends column 16, the low-boiling components or fraction containing methanol and byproduct water is distilled off from the reaction mixture, and the low-boiling components or fraction distilled off is sent to a methanol recovery column 17 via a line 209. The high-boiling fraction obtained after removal of the low-boiling components or fraction from the reaction mixture (low-boiling component removed liquid) is sent to a separator 18 via a line 208. In the methanol recovery column 17, the low-boiling components or fraction is separated into methanol and byproduct water, and the methanol is fed to the first stage reactor 13 and second stage reactor 15 via a line 212 for its reuse as a reactant raw material.

In the separator 18, the high-boiling fraction is allowed to stand, whereby it separates into an ester phase and a glycerine phase. The ester phase is sent to an ester purification column 19 via a line 210, while the glycerine phase is sent to a glycerine purification column 20 via a line 211.

In the ester purification column 19, the desired final product fatty acid alkyl esters are obtained by distillation through a line 213, while the purification residue comprising glycerides, free fatty acids and so forth is recovered through a line 214 and can be reused as a reactant raw material as well.

In the glycerine purification column 20, the desired final product glycerine is obtained by distillation through a line 215, and the purification residue is fed to the degumming reactor 12 via a line 216 for reuse as a reactant raw material.

In another preferred mode of embodiment, the light ends column 16 is used also as the methanol recovery column and thus the methanol recovery column 17 is omitted, and the byproduct water is recovered at the bottom of the light ends column 16. In this case, the light ends column 16 is operated as a methanol recovery column, and the byproduct water may be removed, for example, in a dehydration column additionally disposed between the glycerine purification column 20 and separator 18 or, without adding any dehydration column, the byproduct water may be removed from the top of the glycerine purification column 20 while purified glycerine is obtained by side-cut or partial condensation at the top of the column 20.

In the practice of the invention, the reaction temperature for the reaction of a fat/oil with an alcohol using an insoluble solid catalyst is preferably 50 to 300° C. At below 50° C., the rate of reaction may not be improved to a satisfactory extent while, at above 300° C., such side reactions as alcohol decomposition may not be satisfactorily controlled. Preferably, the reaction temperature is not lower than 70° C. and not higher than 290° C., more preferably not lower than 100° C. and not higher than 280° C.

The reaction pressure is preferably 0.1 to 10 MPa. At below 0.1 MPa, the rate of reaction may not be improved to a satisfactory extent. At above 10 MPa, side reactions may proceed with ease and, in addition, a high pressure-resistant special apparatus is required, hence the utilities cost and plant and equipment cost may not be cut down to a satisfactory extent in certain cases. More preferably, the pressure is not lower than 0.2 MPa and not higher than 9 MPa, and still more preferably not lower than 0.3 MPa and not higher than 6 MPa.

Furthermore, the alcohol may be subjected to reaction in a supercritical condition. The term "supercritical condition" means the defined state of a compound above its critical temperature and critical pressure and, when methanol is used as the alcohol, that condition indicates that a temperature is not lower than 239° C. and a pressure is not lower than 8.0 MPa.

The operation temperature in the step of distilling off low-boiling components or fraction in the practice of the invention is preferably not higher than 300° C. At above 300° C., it may become impossible to distill off the low-boiling components or fraction while sufficiently inhibiting the desired product from being distilled off. More preferably, that temperature is not higher than 280° C., and still more preferably not higher than 250° C. Further, when the alcohol is purified and recovered in the light ends column, as mentioned above, it is possible to operate at lower temperatures, and the operation temperature is preferably not higher than 250° C., more preferably not higher than 220° C. and still more preferably not higher than 210° C. As for the operation pressure, reduced pressure conditions or ordinary pressure conditions are generally employed. Increased pressure conditions may also be employed, however. From the viewpoint of reducing the energy consumption of the production system, reduced pressure conditions are preferred, however.

The insoluble solid catalyst to be used in the practice of the invention may be any one showing insolubility in the raw materials fat/oil and alcohol and in the products (fatty acid esters and glycerine), among others, and may be one having such an extent of insolubility that the effects of the present invention can be produced. For example, the one from which the active metal components can hardly be eluted, as mentioned above, and which, after reaction, can be removed from the reaction system with ease from the industrial viewpoint is preferred. Further, it is preferable that the insoluble solid catalyst is a catalyst capable of catalyzing the esterification of free fatty acids contained in the fat or oil, namely one having activity in both the transesterification of glycerides and the esterification of free fatty acids with an alcohol to the fatty acid alkyl esters. By employing such a mode, it becomes possible to cause the transesterification reaction and esterification reaction to proceed even when the raw material fat/oil contains free fatty acids, hence it becomes possible to improve the yield of fatty acid alkyl esters without providing any esterification reaction step separately from the transesterification reaction step.

In cases where a fat/oil and an alcohol are reacted with each other using the insoluble solid catalyst mentioned above in the above production process, the transesterification reaction of a triglyceride and methanol, for instance, gives fatty acid methyl esters and glycerine, as shown by the formula given below. In the formula, three R's are the same or different and each represents an alkyl group containing 6 to 22 carbon atoms or an alkenyl group containing 6 to 22 carbon atoms and having one or more unsaturated bonds.

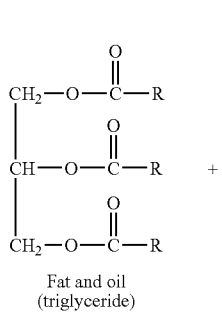

Fat and oil (triglyceride)

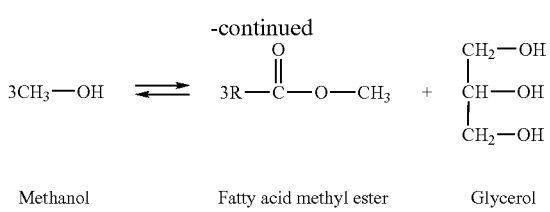

| Methanol | Fatty acid methyl ester | Glycerol |

Thus, in the above production process, the esterification of free fatty acids proceeds simultaneously with the transesterification reaction even when the raw material fat/oil contains free fatty acids and, therefore, the yield of fatty acid alkyl esters can be improved without providing any esterification reaction step separately from the transesterification reaction step. In the above production process, the transesterification reaction gives glycerine, together with fatty acid alkyl esters as shown by the above formula. In accordance with the present invention, purified glycerine can be obtained with ease from the industrial viewpoint, and such glycerine is useful as a chemical material in various fields of application.

As the above-mentioned insoluble solid catalyst, there may be mentioned, among others, a titanium-containing compound, a vanadium-containing compound, a niobium-containing compound, a tantalum-containing compound, a clay species resulting from ion exchange with a rare earth element, an anion exchange resin, a cobalt-containing compound, a nickel-containing compound, a tin-containing compound and a lead-containing compound. Preferred is a compound containing, as an essential component thereof, at least one metal element selected from the group consisting of the metal elements belonging to the Group 4 and the Group 5 in the periodic table.

The compound containing, as an essential component, at least one metal element selected from the group consisting of the metal elements belonging to the Group 4 and the Group 5 in the periodic table is not particularly restricted and may be any compound containing such essential component. Favorably, it is in the form of a simple or mixed oxide, sulfate salt, phosphate salt or a complex, for instance. Further, it is preferred to use the compound in a mode of mixed oxide with other metal elements. The simple or mixed oxide is preferred, among others. More preferably, the compound contains one metal element selected from the group consisting of Ti, Zr, V, Nb and Ta, and still more preferably, it contains one metal element selected from the group consisting of Ti, V, Nb and Ta. There may be mentioned, for example, titanium oxide, vanadium oxide, niobium oxide, tantalum oxide, titanium-vanadium mixed oxide, titanium-niobium mixed oxide, titanium-vanadium-zirconium ternary mixed oxide, and a mixed oxide with other metal elements. These forms of compound may be supported or immobilized on a carrier and, as the carrier or support, there may be mentioned, for example, silica, alumina, silica-alumina, various zeolite species, activated carbon, diatomaceous earth, zirconium oxide, rutile-type titanium oxide, tin oxide, and lead oxide.

Preferably, the above-mentioned catalyst further contains at least one element selected from the group consisting of the elements belonging to the Group 3, 6, 8, 9, 10, 11, 12, 14, 15 and the Group 16 in the periodic table and lanthanoid and, specifically, the catalyst contains one element selected from the group consisting of Si, Fe, Co, Ce, Zn, Mo, W, Ni, Cu, Sc, Y, La, Sn, Pb, Sb, Bi, Se and Te. Among these, the catalyst more preferably contains at least one element selected from the group consisting of the elements belonging to the Group. 8, 9 and the Group 14 in the periodic table and lanthanoid. Concretely, Si, Fe, Co and Ce are specifically preferred from the catalytic activity improvement viewpoint. Such an element is judiciously used as a second component of the essential component-containing compound. In this case, the "second component" means a component supplemental to the essential component mentioned above, and the essential component and second component each may comprise a plurality of species. The metal element selected from the group consisting of the metal elements belonging to the Group 4 and the Group 5 in the periodic table are also referred to as "essential component atoms", and the element selected from the group consisting of the elements belonging to the Group 3, 6, 8, 9, 10, 11, 12, 14, 15 and the Group 16 in the periodic table and lanthanoid are also referred to as "second component atoms".

The content of the above-mentioned second component is not particularly restricted, but the presence ratio of the second component atoms relative to the essential component atoms is generally not less than 0.05 and not more than 10. If it is not more than 0.05, the improvement effect of the catalyst activity may not be sufficiently exerted, and if it is not less than 10, elution of the active metal ingredients of the catalysts (essential component and/or second component) into the liquid reaction mixture may not be sufficiently inhibited. The lower limit is more preferably 0.1, and still more preferably 0.2. In addition, the upper limit is more preferably 5, and still more preferably 3. The ratio is preferably within the range of 0.1 to 5, and more preferably 0.2 to 3.

In the above-mentioned compound containing, as an essential component, at least one metal element selected from the group consisting of the metal elements belonging to the Group 4 and the Group 5 in the periodic table, the form thereof containing the essential component and the above-mentioned second component atoms is suitably a mixed oxide or a mixture of simple oxides, for instance, and a mixed oxide containing the essential component atoms and second component atoms is preferred among them. Such mixed oxide may be either crystallized ones or noncrystalline ones. A crystallized form is preferably used and, among them, those forms having a structure such that the essential component atoms are in the crystal framework are judiciously used. When the compound is in a crystallized form, the catalytic activity of the essential component atoms is further improved and, further, it becomes possible to inhibit the elution of the active metal component to a satisfactory extent.

The form of the above-mentioned mixed oxide is not particularly restricted and includes, for example, the form in which an essential component atom and a second component atom are covalently bonded via an oxygen atom; the form in which the product of bonding of an essential component atom and a second component atom is covalently bound to an oxygen atom; a composite form comprising an essential component atom oxide and a second component atom oxide, and a solid solution form thereof. Mention may also be made of the form comprising a mixed oxide or complex, for instance, supported or immobilized on a carrier.

Suited for use as the mixed oxide mentioned above are those forms including, for example, titanium-silicon mixed oxide, titanium-vanadium mixed oxide, titanium-niobium mixed oxide, titanium-tantalum mixed oxide, iron-vanadium mixed oxide, cobalt-vanadium mixed oxide, cerium-vanadium mixed oxide, molybdenum-niobium mixed oxide, molybdenum-tantalum mixed oxide, tungsten-niobium mixed oxide, tungsten-tantalum mixed oxide, zinc-vanadium mixed oxide, nickel-vanadium mixed oxide, copper-vanadium mixed oxide, scandium-vanadium mixed oxide, lead-vanadium mixed oxide, antimony-vanadium mixed oxide, bismuth-vanadium mixed oxide, selenium-vanadium mixed oxide, tellurium-vanadium mixed oxide; silicon-niobium mixed oxide, iron-niobium mixed oxide, cobalt-niobium mixed oxide, cerium-niobium mixed oxide, zinc-niobium mixed oxide, nickel-niobium mixed oxide, copper-niobium mixed oxide, scandium-niobium mixed oxide, yttrium-niobium mixed oxide, lanthanum-niobium mixed oxide, tin-niobium mixed oxide, lead-niobium mixed oxide, antimony-niobium mixed oxide, bismuth-niobium mixed oxide, selenium-niobium mixed oxide, tellurium-niobium mixed oxide; silicon-tantalum mixed oxide, iron-tantalum mixed oxide, cobalt-tantalum mixed oxide, cerium-tantalum mixed oxide, zinc-tantalum mixed oxide, nickel-tantalum mixed oxide, copper-tantalum mixed oxide, scandium-tantalum mixed oxide, yttrium-tantalum mixed oxide, lanthanum-tantalum mixed oxide, tin-tantalum mixed oxide, lead-tantalum mixed oxide, antimony-tantalum mixed oxide, bismuth-tantalum mixed oxide, selenium-tantalum mixed oxide, tellurium-tantalum mixed oxide and the like and, further, those forms comprising these compounds respectively supported or immobilized on the carrier or support mentioned above.

Preferred among them are those comprising titanium-silicon mixed oxide, iron-vanadium mixed oxide such as $FeVO_4$, cobalt-vanadium mixed oxide such as $Co_2V_2O_7$, cerium-vanadium mixed oxide such as $CeVO_4$, molybdenum-niobium mixed oxide, molybdenum-tantalum mixed oxide, tungsten-niobium mixed oxide and/or tungsten-tantalum mixed oxide. These may be used singly or two or more of them may be used in combination.

More preferably, the above-mentioned insoluble solid catalyst is in one or a combination of two or more form(s) of (1) the form of a titanium-containing oxide catalyst whose Hammett acidity function is $-3.0 \leq H_0 \leq +12.2$, (2) the form of a crystalline titanium mixed oxide catalyst which comprises a crystalline microporous material catalyst containing titanium within the crystal framework and/or a crystalline mesoporous material catalyst containing titanium within the crystal framework and/or (3) the form comprising of oxides whose crystal structure is of the triclinic system.

In the above-mentioned form (1), a titanium-containing oxide catalyst whose Hammett acidity function is $-3.0 \leq H_0 \leq +12.2$ is used. When the function is less than $-3.0$, the condensation of glycerine and/or the decomposition of the alcohol may proceed as the reaction temperature increases and, further, the catalyst life-time may be shortened due to coking. At levels exceeding +12.2, a catalytically active component may be eluted as the reaction temperature increases, hence a step may be required for catalyst separation and/or removal and/or it may become impossible to maintain the activity of the catalyst at a sufficient level. The lower limit value is preferably $-1$, more preferably $+1.5$ and still more preferably $+3.3$, while the upper limit value is preferably $+10$, more preferably $+9$ and still more preferably $+7$.

As the above titanium-containing oxide catalyst, there may be mentioned, for example, anatase-type $TiO_2$, rutile-type $TiO_2$, titania-silica, titania-zirconia, titania-magnesia, titania-calcia, titania-yttria and titania-boria and, among them, anatase-type $TiO_2$, rutile-type $TiO_2$ and titania-silica are preferred.

In the above-mentioned form (2), a crystalline titanium mixed oxide catalyst which comprises a crystalline microporous material catalyst containing titanium within the crystal framework and/or a crystalline mesoporous material catalyst containing titanium within the crystal framework is used.

The "crystalline titanium mixed oxide", so referred to above, means a crystallized mixed oxide containing titanium atoms as the essential component and showing catalytic activity. Since it is in such a crystallized state and has a large surface area, its activity as a catalyst is improved. Preferred as such a crystalline titanium mixed oxide are those involving covalent bonding of a titanium atom and another metal atom via an oxygen atom. Further, a suited is one having a structure such that a titanium atom occurs in the crystal framework. With such, the elution of active metal components can be fully suppressed and, therefore, the production process can be simplified while omitting the step of active metal component separation, hence the catalyst can be used over a long period of time.

A crystalline titanosilicate is also a preferred form of the crystalline titanium mixed oxide. The crystalline titanosilicate has a structure such that titanium atoms are each taken up into a silicon framework via an oxygen atom; it hardly allows titanium atom elution and is little susceptible to leaching and, therefore, makes it possible to simplify or omit the step of catalyst separation or removal and, further, to maintain the activity as a catalyst for a long period of time.

The above-mentioned crystalline microporous material containing titanium within the crystal framework is a material containing titanium atoms as the essential component within the crystal framework constituting the crystallized catalyst and belongs to the class of a crystalline mixed oxide having smallest pore size as classified according to the pore size structure. In a preferred form, the micropore diameter is smaller than 2 nm.

As the crystalline microporous material containing titanium within the crystal framework, there may be mentioned, among others, a crystalline microporous material having a zeolite structure such as titanosilicate (TS-1) having the MFI-type zeolite structure, MFI-type titanoaluminosilicate, MEL-type titanosilicate (TS-2), MEL-type titanoaluminosilicate, BEA-type titanosilicate, BEA-type titanoaluminosilicate, RUT-type titanosilicate, RUT-type titanoaluminosilicate, MWW-type titanosilicate, MWW-type titanoaluminosilicate, ETS-4 type titanosilicate and ETS-10 type titanosilicate; and a crystalline microporous material of a crystalline titanoaluminophosphate such as TAPO-5, TAPO-11 and TAPO-34. Among them, TS-1 type titanosilicate is preferred.

The crystalline mesoporous material containing titanium within the crystal framework is a material containing titanium atoms as the essential component within the crystal framework constituting the crystallized catalyst and belongs to the class of a crystalline mixed oxide having the pore size next to above-mentioned crystalline microporous material as classified according to the pore size structure. In preferred form, the pore diameter is regularly not smaller than 2 nm and not greater than 20 nm. As such crystalline mesoporous material containing titanium within the crystal framework, there may be mentioned, for example, Ti-containing MCM-41, Ti-containing SBA-1, and Ti-containing SBA-15.

In the above-mentioned form (3), the triclinic system is a crystal system in which all the three crystal axes are not at right angles to one another and the lengths of the crystal axes are unequal to one another and which has thus a triclinic lattice. The one comprising triclinic $FeVO_4$ is preferred among others.

Also preferred as the above-mentioned insoluble solid catalyst are (4) the forms thereof comprising an oxide whose crystal is composed of an octahedral skeleton formed by coordination of the essential metal component with oxygen atoms in a six-coordinate complex-forming manner. More preferred are, in particular, (5) the forms whose crystal structure is of the rutile type, and (6) the forms whose crystal comprises an octahedral skeleton and which comprises a layered oxide resulting from bonding of at least one pair of the octahedrons with at least one edge sharing. Also preferred are the forms resulting from combination of two or more of those forms mentioned above.

In the above-mentioned form (4), the essential metal component forms an octahedral skeleton with 6 oxygen atoms as ligands situated at vertices of the octahedron. In a preferred form, the essential metal component is located at the center of each octahedron of the octahedral skeleton. Since the metal component is surrounded by 6 ligands, the metal component is hardly eluted. As such crystal structure of a catalyst, there may be mentioned the rutile structure, corundum structure and ilmenite structure, among others, and the rutile structure is preferred. As such catalyst, there may be mentioned rutile-type $TiVO_4$ mixed oxide (or solid solution), among others.

As regards the above-mentioned form (5), the rutile structure is a crystal structure belonging to the tetragonal system and formed by a compound represented by $AB2$ (A: positive atom, B: negative atom), typically. In such crystal structure, each A atom is octahedrally coordinated by B atoms and the resulting octahedrons form a skeletal structure as a result of each octahedron sharing a vertex or edge with each neighboring octahedron. Such compounds having the rutile structure can be obtained by calcining compounds having the anatase structure.

The edge-sharing octahedral layered oxide in the above-mentioned form (6) is in a state such that the essential metal component is confined in the octahedron. Therefore, metal elusion hardly occurs, and the edge sharing can render the oxide stable.

The above-mentioned layered oxide has a layered structure formed as a result of a pile of sheet-like layers of oxide. Preferred are those resulting from a pile of sheets of mixed oxide containing at least one metal element selected from the group consisting of the metal elements belonging to the Group 4 and the Group 5 in the periodic table.

It is also preferred that the insoluble solid catalyst comprises a layered oxide represented by the following general formula (1):

$$ATi_xMO_{(2x+3)} \quad (1)$$

wherein A represents a hydrogen atom or an alkali metal atom, M represents a niobium atom or a tantalum atom and X is a natural number not greater than 7.

The above A is a hydrogen atom or an alkali metal atom. Preferably, it is a hydrogen atom or a lithium, sodium, potassium or cesium atom. More preferably, it is a hydrogen atom. Preferably, such layered oxide is a titanium-containing layered mixed oxide.

Suited for use as the above layered oxide are, for example, $HTiNbO_5$, $KTiNbO_5$, $CsTiNbO_5$, $HTi_2NbO_7m$, $CsTi_2NbO_7$, $HTi_3NbO_9$, $KTi_3NbO_9$, $CsTi_3NbO_9$, $HNb_3O_8$, $KNb_3O_8$, $CsNb_3O_8$, $HTiTaO_5$, $KTiTaO_5$, $CsTiTaO_5$, $HNbMoO_6$, $KNbMoO_6$, $CsNbMoO_6$, $HNbWO_6$, $KNbWO_6$, $CsNbWO_6$, $HTaMoO_6$, $KTaMoO_6$, $CsTaMoO_6$, $HTaWO_6$, $KTaWO_6$, $CsTaWO_6$, and titanium phosphate. These may be used singly or two or more of them may be used in combination. Among them, $HTiNbO_5$, $HTi_2NbO_7$, $HNb_3O_8$, $HNbMoO_6$ and $HNbWO_6$ are preferred.

The fat or oil to be used in the practice of the present invention contains glycerine esters of fatty acids and may be any species that can serve as a raw material for fatty acid alkyl esters together with an alcohol. Thus, those generally called "a fat and oil" can be used. It is generally preferred that use be made of the fat and oil comprising triglycerides (triesters of higher fatty acids with glycerine) as main components and containing small amounts of diglycerides and monoglycerides and other components as impurities. Glycerine esters of fatty acids such as triolein may also be used.

Usable as the above-mentioned fat or oil are a vegetable oil such as rapeseed oil, sesame oil, soybean oil, corn oil, sunflower oil, palm oil, palm kernel oil, coconut oil, safflower oil, linseed oil, cottonseed oil, tung oil and castor oil; an animal oil such as beef fat, lard, fish oil and whale oil; and a various used edible oil (edible oil wastes), among others. One or two or more of these may be used.

In cases where the above fat or oil contains phospholipids, proteins or the like as impurities, the fat or oil is preferably used after a degumming step which comprises adding a mineral acid such as sulfuric acid, nitric acid, phosphoric acid or boric acid to the fat or oil for removing the impurities therefrom.

As the alcohol, a lower alcohol is preferable to be easily removed as low-boiling components or fraction. The lower alcohol mentioned herein refers to an alcohol containing 1 to 6 carbon atoms, preferably 1 to 3 carbon atoms.

In the practice of the invention, the alcohol is preferably one containing 1 to 6 carbon atoms. Employable as the alcohol containing 1 to 6 carbon atoms are, for example, methanol, ethanol, propanol, isopropyl alcohol, 1-butanol, 2-butanol, t-butyl alcohol, 1-pentanol, 3-pentanol, 1-hexanol, 2-hexanol, and so forth. Among them, methanol is preferred.

In the practice of the invention, a polyol can also be used instead of the alcohol. One or more of ethylene glycol, propylene glycol, glycerine, pentaerythritol, sorbitol and the like can be used as such polyol. Among them, glycerine is preferred.

In the production process according to the invention, some component other than the fat/oil, alcohol and catalyst may be present in the reaction system.

The present invention also contains a composition obtained by the reaction of a fat or oil with an alcohol using an insoluble solid catalyst, which comprises not less than 98.00% by mass and not more than 99.92% by mass of a fatty acid alkyl esters and not less than 800 ppm and not more than 4,500 ppm of free fatty acids. The above composition is suited for use in biodiesel fuels or as a surfactant intermediate. In particular, it is preferably used in biodiesel fuels.

When free fatty acids content lower than 800 ppm is to be attained, the purification and washing steps, among others, cannot be simplified, hence any satisfactorily great advantage from the energy viewpoint cannot be obtained. When that content is above 4,500 ppm, diesel engine corrosion may not be fully inhibited or decreases in cetane number may unfavorably result. The lower limit value is preferably 900 ppm, more preferably 1,000 ppm. The upper limit value is preferably 3,000 ppm, more preferably 2,500 ppm.

When the fatty acid alkyl esters content is lower than 98.00% by mass, the composition can no longer be used wholly satisfactorily in various fields of application. When it is above 99.92% by mass, the process for preparing the composition is no more wholly advantageous from the energy viewpoint. The lower limit value is preferably 98.50% by mass, and the upper limit value is preferably 99.90% by mass.

Such fatty acid alkyl esters-containing composition is preferably produced by such a production process as described hereinabove. Thus, compositions useful in various fields of application can be produced advantageously from the energy viewpoint while reducing the energy consumption of the production. As the method of controlling free fatty acids content in the range mentioned above in producing said composition by the production process mentioned above, there may be mentioned the method comprising increasing the usage of methanol, the method comprising reducing the amount of water contained in the raw materials and the method comprising prolonging the reaction time (contacting time in the case of flow reaction), for instance, in the case of production in one reaction stage and, in the case of production in two or more reaction stages, those methods mentioned above as well as the method comprising increasing the conversion in the first stage, the method comprising increasing the number of reaction stages (number of reactors disposed in series) and the method comprising increasing the usage of the alcohol in the last reaction stage, for instance.

The method of producing fatty acid alkyl esters and/or glycerine according to the invention, which has the constitution described above, is a method of producing high-purity fatty acid alkyl esters and/or glycerine advantageously from the energy viewpoint while reducing the energy consumption of the production, and the products can be used in various fields of application, for example in biodiesel fuels, foods, cosmetics and pharmaceuticals.

EXPLANATION OF SYMBOLS

Figure 1:
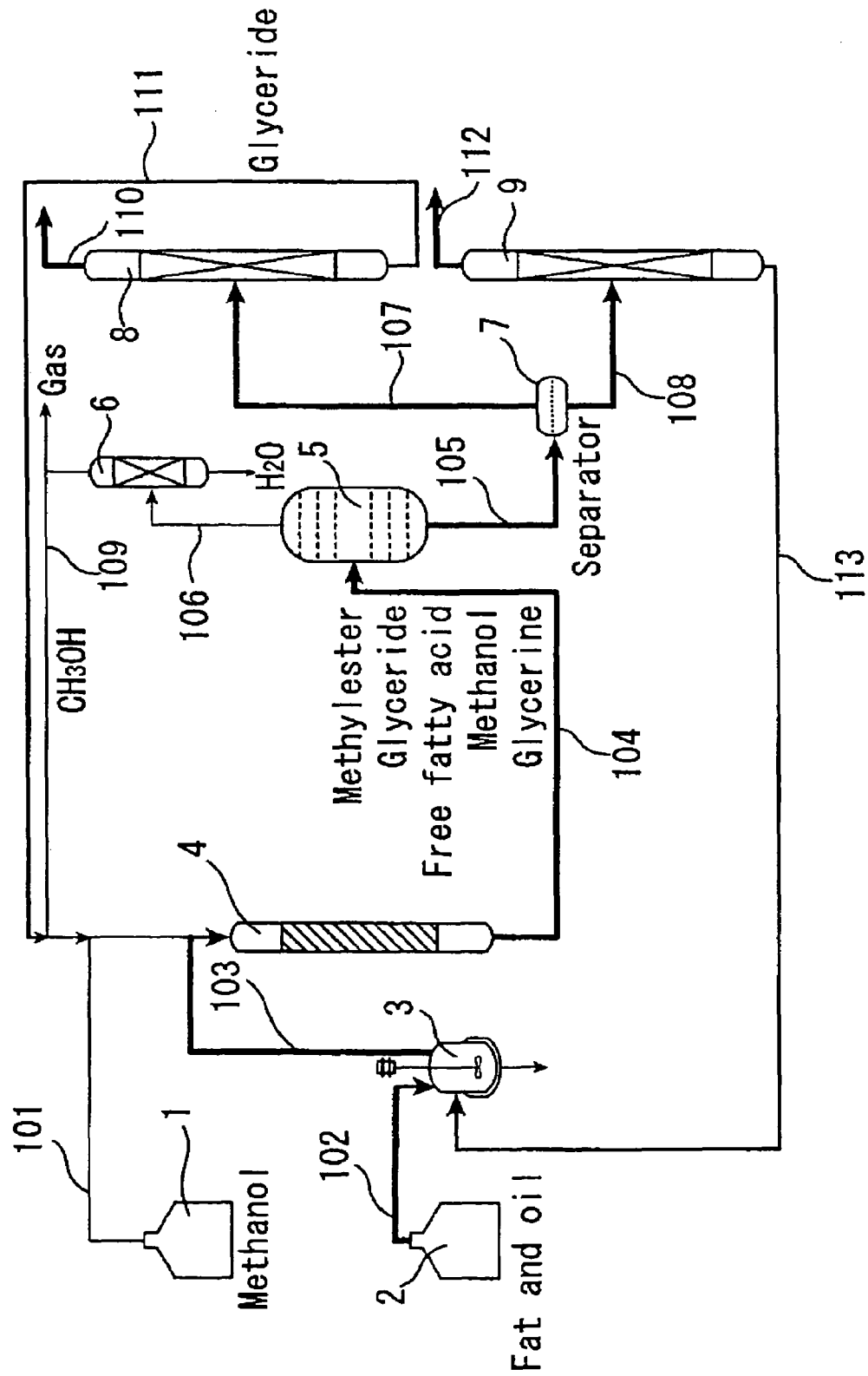
FIG. 1 is a schematic representation of one of the preferred embodiments of the production method of the invention to be employed in the case of production in one reaction stage.

1, 10: Methanol reservoir;
2, 11: oil/fat reservoir;
3, 12: degumming reactor;
4:. reactor;
5, 16: light ends column;
6, 17: methanol recovery column;
7, 14, 18: separator;
8, 19: ester purification column;
9, 20: glycerine purification column;
13: first-stage reactor;
15: second-stage reactor;
101-113, 201-216: line.

BEST MODES FOR CARRYING OUT THE INVENTION

The following examples illustrate the present invention in further detail. These examples are, however, by no means limitative of the scope of the invention. Unless otherwise specified, "part(s)" means "part(s) by weight", and "%" means "% by mass".

In the examples, the yields of fatty acid methyl esters and glycerine were calculated as follows:

Yield of fatty acid alkyl esters (mol %)=(total molar flow rate of fatty acid alkyl esters at the outlet of reactor)/(total molar flow rate of effective fatty acid components at the inlet of reactor)]×100
Yield of glycerine (mol %)=[(total molar flow rate of free glycerine at the outlet of reactor)/(molar flow rate of effective glycerine components at the inlet of reactor)]×100

The term "effective glycerine components" means those components which can provide glycerine when the method of the invention is applied. Specifically, the effective glycerine components include fatty acid triglycerides, diglycerides and monoglycerides contained in the fat/oil and glycerine in the recycled raw material. The content of effective glycerine components can be determined by the gas chromatography of free glycerine afforded by saponification of the fat/oil (reactant).

In the examples, a palm oil having a saponification value of 195.9, free fatty acids content of 5.1% by mass, a moisture content of 0.06% by mass and an effective glycerine component content of 10.7% by mass was used as the reactant raw material.

CATALYST PREPARATION EXAMPLE 1

Catalyst A: To a solution prepared by dissolving 25.74 g of ammonium metavanadate in 700 g of distilled water at 90° C. was added dropwise 169.66 g of a 20% aqueous solution of titanium(III) trichloride. After evaporation to dryness, the residue was preliminarily calcined at 350° C. under air atmosphere for 2 hours and then calcined at 750° C. for 5 hours to give a titanium/vanadium mixed oxide catalyst (catalyst A). X-ray diffraction analysis revealed that the catalyst A was a mixture mainly composed of a mixed oxide of the rutile-type $TiVO_4$ structure and small amount of vanadium pentoxide.

Catalyst B: Potassium carbonate (13.9 g) was dissolved in distilled water (30 g). Anatase-type titanium oxide (16.0 g) and niobium oxide ($Nb_2O_5$) (26.6 g) were mixed up in a mortar, and the potassium carbonate solution was added to the mixture. The whole mixture was kneaded until it became homogeneous slurry. After 24 hours of drying at 120° C., calcination was carried out at 1,100° C. for 3 hours to give potassium titanoniobate ($KTiNbO_5$). This was subjected twice to ion exchange in a 6 N aqueous solution of nitric acid (150 mL), followed by washing with water and further by 2 hours of calcination at 500° C. to give layered $HTiNbO_5$ (catalyst B).

Catalyst C: Ammonium metavanadate (14.04 g) was dissolved in 700 g of distilled water at 90° C. (solution A). A solution prepared by dissolving 48.48 g of iron(III) nitrate nonahydrate in 40 g of distilled water was added dropwise to the solution A, and the mixture was then evaporated to dryness with stirring. The residue was preliminarily calcined, under air atmosphere, at 350° C. for 2 hours and then calcined at 750° C. for 5 hours to give an iron-vanadium mixed oxide catalyst (catalyst C). X-ray diffraction analysis revealed that the catalyst C was principally a mixed oxide of the triclinic $FeVO_4$ structure.

Catalyst D: A silica powder (10 g) was mixed, by kneading, with a solution prepared by homogeneously dissolving 7.49 g of vanadyl oxalate n-hydrate and 13.45 g of iron(III) nitrate nonahydrate in methanol, and the mixture was evaporated to dryness with stirring. The residue was preliminarily calcined, under air atmosphere, at 350° C. for 2 hours and then calcined at 750° C. for 5 hours to give a silica-supported iron-vanadium mixed oxide catalyst (catalyst D).

Catalyst E: A cerium-vanadium oxide-based catalyst (catalyst E) was obtained in the same manner as in the case of catalyst C except that 53.17 g of cerium(III) nitrate hexahydrate was used instead of iron nitrate. X-ray diffraction analysis revealed that the catalyst E was mainly composed of cerium (IV) dioxide and a mixed oxide of the $CeVO_4$ structure.

Catalyst F: A cobalt-vanadium mixed oxide catalyst (catalyst F) was obtained in the same manner as in the case of the catalyst C except that 35.64 g of cobalt(II) nitrate hexahydrate was used instead of iron nitrate. X-ray diffraction analysis revealed that the catalyst F was principally a mixed oxide of the $Co_2V_2O_7$ structure.

Catalyst G: A vanadium oxide catalyst (catalyst G) was obtained by calcining 21.06 g of an ammonium metavanadate powder under air atmosphere at 500° C. for 3 hours. X-ray diffraction analysis revealed that the catalyst G principally comprised vanadium pentoxide.

Catalysts H and I: Niobium oxide ($Nb_2O_5$) obtained from Wako Pure Chemical Industries was used as catalyst H, and tantalum oxide ($Ta_2O_5$) obtained from the same company as catalyst I.

Catalyst J: Potassium carbonate (3.47 g) and 19.96 g of niobium oxide ($Nb_2O_5$) were mixed up in a mortar, a small amount of water was added, and the resulting mixture was further kneaded thoroughly. The mixture was dried at 120° C. for 4 hours and then calcined at 1,100° C. for 3 hours to give potassium triniobate ($KNb_3O_8$). This was subjected twice to ion exchange with a 1 N aqueous solution of nitric acid (1 L), followed by washing with water and further by 2 hours of calcination at 500° C. to give layered $HNb_3O_8$ (catalyst J).

Catalyst K: Tetramethyl orthosilicate (96.8 g) and 4.8 g of tetraethyl orthotitanate were mixed up in a nitrogen atmosphere. To the resulting solution was added dropwise 400 g of a 10% aqueous solution of tetrapropylammonium hydroxide. After 3 hours of refluxing at 90° C., the mixture was transferred to an autoclave, and the hydrothermal synthesis was carried out at 175° C. for 48 hours. The thus-obtained white slurry was collected by centrifugation, washed with water and calcined at 550° C. for 3 hours under air atmosphere to give an MFI-type titanosilicate (TS-1) catalyst (catalyst K). The titanosilicate obtained had a Ti/Si atomic ratio of 1/22.

Catalyst L: A silica powder (20 g) was kneaded in a solution prepared by homogeneously dissolving 3.56 g of titanium tetraisopropoxide in isopropanol and the mixture was then evaporated to dryness with stirring. The residue was calcined at 500° C. for 5 hours under air atmosphere to give a silica-supported titanium oxide catalyst (catalyst L).

Catalyst M: 80.99 g of zirconyl nitrate (IV) dihydrate was dissolved in 1 L of distilled water. A solution prepared by dissolving 9.21 g of titanyl sulfate (IV) in 23 g of distilled water was added dropwise thereto, and then 150 g of 6.5% ammonia water was added dropwise to precipitate a solid. The obtained solid was washed with 500 mL of distilled water 6 times, and dried at 120° C. overnight. 8.46 g of vanadyl sulfate (IV) tetrahydrate was dissolved in 25 g of distilled water, kneaded with the solid obtained above, and evaporated to dryness with stirring. The resultant was preliminarily calcined at 350° C. for 2 hours under air atmosphere, and then calcined at 750° C. for 5 hours to give titanium-vanadium-zirconium ternary mixed oxide (catalyst M).

EXAMPLE 1

The catalyst A prepared in Catalyst Preparation Example 1 was compression molded, followed by crushing to attain grain sizes of 300 to 850 μm. The reaction apparatus shown in FIG. 1 was used, and a straight tubular reactor (4) made of SUS-316 stainless steel and having an inside diameter of 20 mm and a length of 450 mm was packed with the molded catalyst A (220 g). For enabling pressure control, the reactor outlet was equipped with a filter and a backpressure regulator via an air-cooled condenser. Palm oil and methanol were used as the reactant raw materials. Palm oil was deprived of proteins and phospholipids in advance by adding phosphoric acid to cause precipitation thereof, and the thus-degummed palm oil was used for the reaction.

Using high-pressure constant delivery precision pumps, the palm oil (205 g/h) and methanol (41 g/h) were mixed together in a line and continuously passed through the reactor downward from the top. The pressure within the tubular reactor was adjusted to 5 MPa by means of the backpressure regulator. The supply of methanol relative to the palm oil was 1.8 times the theoretical amount to be fed. The tube inside temperature was adjusted to 200° C. by externally heating the tubular reactor portion. At 3 hours after stabilization of the temperature and pressure, the total flow rate of fatty acid methyl esters at the outlet of the reactor was 192 g/h, the total flow rate of free fatty acids was 2.76 g/h, that of monoglycerides was 10.4 g/h, and that of diglycerides was 0.646 g/h. Thus, the whole amount of triglycerides had been consumed. The flow rate of free glycerine at the outlet of the reactor was 19.9 g/h, that of methanol was 19.3 g/h, and that of byproduct water was 0.658 g/h. The yield of fatty acid methyl esters and free glycerine were 90 mol % and 91 mol %, respectively.

The liquid reaction mixture in the line (104) was sampled for ICP analysis to determine the elution of active components of the catalyst. In the upper layer, no Ti component was detected and the V component concentration was not higher than 1 ppm and, for the lower layer, the Ti component concentration was 2 ppm and the V component concentration was 35 ppm.

This effluent was continuously fed, at 100° C., to a light ends column (5), and methanol was recovered, together with byproduct water, by flash distillation. The operation temperature at the bottom of the light ends column was 240° C., and the operation pressure was 81 kPa (608 mm Hg). The methanol and byproduct water were fed, in a gaseous state, to a methanol recovery column (6) from the top of the light ends column. The methanol recovery column was a 23-stage distillation column; the reflux ratio was 0.5, the operation temperature at the bottom was 94° C., and the operation pressure was 81 kPa (608 mm Hg). Methanol with a moisture content of 0.7% was obtained from the column top at a rate of 19.3 g/h, and that methanol was reused as a raw reactant material.

The heavy fraction continuously drawn out from the bottom of the light ends column was continuously fed to a separator (7) at a flow rate of 227 g/h for phase separation. The upper layer (ester phase) drawn out of the separator (7) contained 93% by mass of fatty acid methyl esters and, further, glycerides and a small proportion of methanol. This crude ester phase was continuously fed to a fatty acid ester purification column (8) for purification. The fatty acid ester purification column was a 23-stage distillation column, and the reflux ratio was 1, the bottom operation temperature was 213° C. and the operation pressure was 0.4 kPa (3 mm Hg). Purified fatty acid methyl esters were obtained from the column top at a rate of 191 g/h. The glycerides were recovered from the bottom and reused as one of the raw materials.

On the other hand, the lower layer (glycerine phase) drawn out of the separator (7) contained 98% by mass of glycerine and, further, byproduct water and small proportions of fatty acid methyl esters and gum components such as phospholipids. This crude glycerine phase was continuously fed to a glycerine purification column (9). The glycerine purification column was a 10-stage distillation column, and the reflux ratio was 0.1, the bottom temperature was 150° C. and the operation pressure was 0.4 kPa (3 mm Hg). Glycerine was distilled off, together with byproduct water and a small amount of methanol, from the column top and partially condensed at 61° C. and thereby deprived of gaseous methanol and water, which remained in a gaseous form. Purified glycerine was thus obtained at a rate of 19.9 g/h. The fatty acid methyl esters and gum components recovered from the bottom were subjected to degumming, and the degummed fraction was reused as one of the raw materials.

EXAMPLE 2

Figure 2:
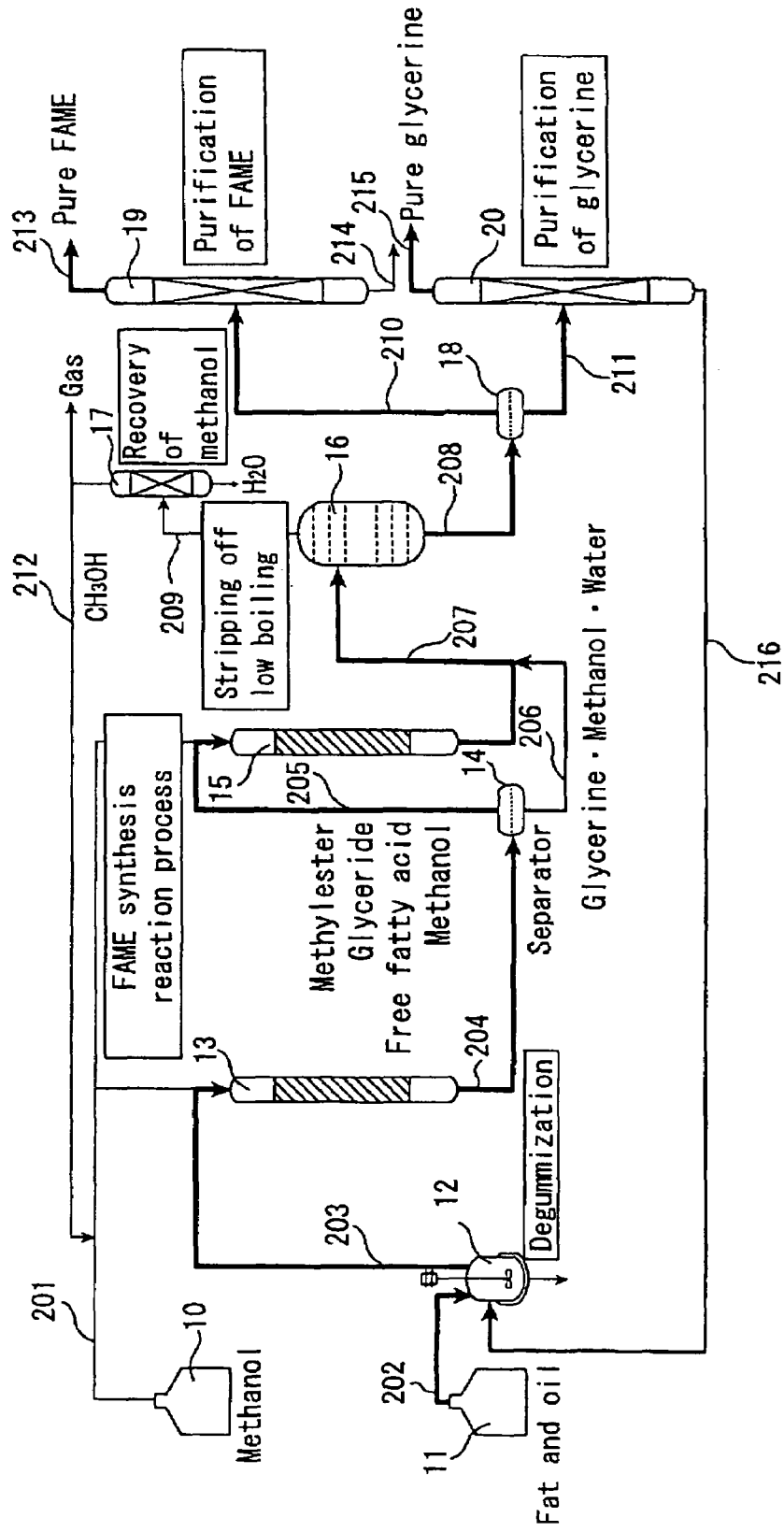
FIG. 2 is a schematic representation of one of the preferred embodiments of the production method of the invention to be employed in the case of production in two reaction stages.

The catalyst A prepared in Catalyst Preparation Example 1 was compression molded and then crushed, followed by classification to collect grains with a grain diameter of 300 to 850 μm. The same reaction apparatus as shown in FIG. 2 was used except that it did not include the methanol recovery column (17). The reactants used were same palm oil and methanol as in Example 1. The first-stage reactor (13) (straight tube made of SUS-316 stainless steel, 26 mm in inside diameter and 500 mm in length) was packed with the molded catalyst (400 g). The reaction temperature was set at 150° C., and the pressure at 2.5 MPa.

Using high-pressure constant delivery precision pumps, the palm oil (205 g/h) and methanol (41 g/h) were mixed together in a line and continuously fed to the first-stage reactor (13) downward from the top. The supply of methanol relative to the palm oil was 1.8 times the theoretical amount to be fed. The yield of fatty acid methyl esters and glycerine in the first-stage reaction were 64 mol % and 25 mol %, respectively. The reactor tube was equipped, at the outlet thereof, with a liquid-liquid separator (14) via an air-cooled condenser, and the lower layer (glycerine phase) was drawn out at a rate of 22 g/h while maintaining the liquid-liquid interface at a constant level. The upper layer (224 g/h) was fed, together with methanol (16 g/h) to a second-stage reactor (15). The supply of methanol was 2.9 times the theoretical amount to be fed relative to the upper layer liquid drawn out.

In the second-stage tubular reactor (made of SUS-316, 20 mm in inside diameter and 450 mm in length) was packed with the molded catalyst (220 g). The reactor tube outlet was equipped with a filter and a backpressure regulator via an air-cooled condenser, and the pressure within the reactor tube was set at 2.5 MPa. The reaction temperature was set at 150° C. and, at 3 hours after stabilization of the temperature and pressure, the effluent from the second-stage reactor was mixed, at the outlet, with the lower layer (glycerine phase) from the separator (14). In the line 207, the total flow rate of fatty acid methyl esters was 202 g/h, the total flow rate of free fatty acids was 1.94 g/h, that of monoglycerides was 3.57 g/h, and that of diglycerides was 0.248 g/h. Thus, the whole amount of triglycerides had been consumed. The flow rate of free glycerine was 20.4 g/h, that of methanol was 33.9 g/h, and that of byproduct water was 0.494 g/h. The overall yield of cumulative fatty acid methyl esters and free glycerine in the first-stage and second-stage reactions were 95 mol % and 93 mol %, respectively.

The liquid reaction mixture in the line 207 was sampled for ICP analysis to determine the elution of active components of the catalyst. In the upper layer, no Ti component was detected and the V component concentration was not higher than 0.6 ppm and, for the lower layer, the Ti component concentration was 1 ppm and the V component concentration was 30 ppm.

This effluent was continuously fed, at 100° C., to a light ends column (16), and methanol was recovered by flash distillation. The operation temperature at the bottom of the light ends column was 207° C., and the operation pressure was 61 kPa (456 mm Hg). Methanol with a water content of 1.1% by mass was recovered at a rate of 33.9 g/h, and this was reused as a raw material in the first-stage reaction.

The heavy fraction continuously drawn out from the bottom of the light ends column was continuously fed to a separator (18) at a flow rate of 228 g/h for phase separation. The upper layer (ester phase) drawn out of the separator (18) contained 97% by mass of fatty acid methyl esters and, further, glycerides and a small proportion of methanol. This crude ester phase was continuously fed to a fatty acid ester purification column (19) for purification. The fatty acid methyl ester purification column was a 23-stage distillation column, and the reflux ratio was 1, the bottom operation temperature was 205° C. and the operation pressure was 0.4 kPa (3 mm Hg). Purified fatty acid methyl esters were obtained from the column top at a rate of 201 g/h. The glycerides were recovered from the bottom and reused as one of the raw materials.

On the other hand, the lower layer (glycerine phase) drawn out of the separator (18) contained 97% by mass of glycerine and, further, byproduct water and small proportions of fatty acid methyl esters and gum components such as phospholipids. This crude glycerine phase was continuously fed to a glycerine purification column (20). The glycerine purification column was a 10-stage distillation column, and the reflux ratio was 0.1, the bottom temperature was 161° C. and the operation pressure was 0.4 kPa (3 mm Hg). Glycerine was distilled off, together with byproduct water and a small amount of methanol, from the column top and partially condensed at 50° C. and thereby deprived of gaseous methanol and water, which remained in a gaseous form. Purified glycerine was thus obtained at a rate of 20.4 g/h. The fatty acid methyl esters and gum components recovered from the bottom were subjected to degumming, and the degummed fraction was reused as one of the raw materials.

EXAMPLE 3

The catalyst B was compression molded and then crushed, followed by classification to collect grains with a grain diameter of 300 to 850 pm. The same reaction apparatus as shown in FIG. 1 was used, and a straight tubular reactor (4) made of SUS-316 stainless steel and having an inside diameter of 30 mm and a length of 600 mm was packed with the molded catalyst (540 g). For enabling pressure control, the reactor outlet was equipped with a filter and a backpressure regulator via an air-cooled condenser.

Using high-pressure constant delivery precision pumps, the palm oil (205 g/h) and methanol (68.8 g/h) were mixed together in a line and continuously passed through the reactor downward from the top. The pressure within the tubular reactor was set at 3.5 MPa by means of the backpressure regulator. The supply of methanol relative to the palm oil was 3.0 times the theoretical amount to be fed. The tube inside temperature was set at 200° C. by externally heating the tubular reactor portion. At 3 hours after stabilization of the temperature and pressure, the total flow rate of fatty acid methyl esters at the outlet of the reactor was 194 g/h, the total flow rate of free fatty acids was 1.31 g/h, that of monoglycerides was 10.4 g/h, and that of diglycerides was 0.646 g/h. Thus, the whole amount of triglycerides had been consumed. The flow rate of free glycerine at the outlet of the reactor was 19.9 g/h, that of methanol was 46.9 g/h, and that of byproduct water was 0.750 g/h. The yield of fatty acid methyl esters and free glycerine were 91 mol % and 91 mol %, respectively.

The liquid reaction mixture in the line 104 was sampled for XRF analysis to determine the elution of active components of the catalyst, the total concentration of active metal components Ti and V in both the upper layer and lower layer was not more than 1,000 ppm. Furthermore, when ICP analysis was performed, in both the upper layer and lower layer, neither Ti component nor Nb component was detected. This effluent was continuously fed, at 100° C., to a light ends column (5), and methanol was recovered, together with byproduct water, by flash distillation. The operation temperature at the bottom of the light ends column was 247° C., and the operation pressure was 81 kPa (608 mm Hg). The methanol and byproduct water were fed, in a gaseous state, to a methanol recovery column (6) from the top of the light ends column. The methanol recovery column was a 23-stage distillation column; the reflux ratio was 1.0, the operation temperature at the bottom was 83° C., and the operation pressure was 81 kPa (608 mm Hg). Methanol with a moisture content of 0.1% was obtained from the column top at a rate of 46.7 g/h, and that methanol was reused as a raw reactant material.

The heavy fraction continuously drawn out from the bottom of the light ends column was continuously fed to a separator (7) at a flow rate of 226 g/h for phase separation. The upper layer (ester phase) drawn out of the separator (7) contained 94% by mass of fatty acid methyl esters and, further, glycerides and a small proportion of methanol. The crude ester phase was continuously fed to a fatty acid ester purification column (8) for purification. The fatty acid ester purification column was a 23-stage distillation column, and the reflux ratio was 1.0, the bottom operation temperature was 223° C. and the operation pressure was 0.4 kPa (3 mm Hg). Purified fatty acid methyl esters were obtained from the column top at a rate of 194 g/h. The glycerides were recovered from the bottom and reused as one of the raw materials.

On the other hand, the lower layer (glycerine phase) drawn out of the separator (7) contained 99% by mass of glycerine and, further, byproduct water and small proportions of fatty acid methyl esters and gum components such as phospholipids. The crude glycerine phase was continuously fed to a glycerine purification column (9). The glycerine purification column was a 10-stage distillation column, and the reflux ratio was 0.1, the bottom temperature was 148° C. and the operation pressure was 0.4 kPa (3 mm Hg). Glycerine was distilled off, together with byproduct water and a small amount of methanol, from the column top and partially condensed at 114° C. and thereby deprived gaseous of methanol and water, which remained in a gaseous form. Purified glycerine was thus obtained at a rate of 19.8 g/h. The fatty acid methyl esters and gum components recovered from the bottom were subjected to degumming, and the degummed fraction was reused as one of the raw materials.

EXAMPLE 4

A 200 mL autoclave was charged with triolein (60 g), methanol (20 g) and the catalyst A (TiVO$_4$) (2.5 g). After nitrogen replacement, the reaction was allowed to proceed at a reaction temperature of 150° C. for 24 hours with internal stirring. The yield of methyl oleate was 79%, and the yield of glycerine was 51%. XRF analysis was performed and ensured that the total concentration of active metal components Ti and V was not more than 1,000 ppm. Furthermore, when ICP analysis was performed, no elution was observed, that is the vanadium content in the ester phase was not higher than 1 ppm.

COMPARATIVE EXAMPLE 1

The reaction was carried out in the same manner as in Example 4 except that hydrotalcite was used as the catalyst. The yield of methyl oleate was 77%, and the yield of glycerine was 63%. As a result of XRF analysis of the ester phase, it was revealed that almost the whole amount of magnesium constituting hydrotalcite and about half of the amount of aluminum had been eluted as described in Table 1.

EXAMPLES 5 TO 12

The reaction was carried out in the same manner as in Example 4 except that one of the catalysts C to J was used instead of the catalyst A. The results are shown in Table 1. In the "elution" column, "N.D." means that the elution level is not higher than 1 ppm.

TABLE 1

| | Catalyst | Yield of methyl oleate (%) | Yield of glycerine (%) | Elution (ppm) |
|---|---|---|---|---|
| Ex. 4 | Catalyst A (TiVO$_4$) | 79 | 51 | Ti: N.D V: N.D |
| Ex. 5 | Catalyst C (FeVO$_4$) | 66 | 20 | Fe: N.D V: 130 |
| Ex. 6 | Catalyst D (FeVO$_4$/SiO$_2$) | 66 | 31 | Fe: N.D V: 13 |
| Ex. 7 | Catalyst E (CeVO$_4$) | 65 | 24 | Ce: N.D V: 250 |
| Ex. 8 | Catalyst F (Co$_2$V$_2$O$_7$) | 43 | 15 | Co: N.D V: N.D |
| Ex. 9 | Catalyst G (V$_2$O$_5$) | 88 | 32 | 70 |
| Ex. 10 | Catalyst H (Nb$_2$O$_5$) | 45 | 14 | N.D |
| Ex. 11 | Catalyst I (Ta$_2$O$_5$) | 50 | 18 | N.D |
| Ex. 12 | Catalyst J (HNb$_3$O$_8$) | 49 | 2 | N.D |
| Compar. Ex. 1 | Hydrotalcite | 77 | 63 | Mg: 17800 Al: 6900 |

EXAMPLES 13 TO 16

The reaction was carried out in the same manner as in Example 4 except that the catalyst B, K, L or M was used instead of the catalyst A and that the reaction temperature was changed from 150° C. to 200° C. The results are shown in Table 2. In the "elution" column, "N.D." means that the elution level is not higher than 1 ppm.

TABLE 2

| | Catalyst | Yield of methyl oleate (%) | Yield of glycerine (%) | Elution (ppm) |
|---|---|---|---|---|
| Ex. 13 | Catalyst B (HTiNbO$_5$) | 80 | 56 | N.D |
| Ex. 14 | Catalyst K (TS-1) | 76 | 53 | N.D |
| Ex. 15 | Catalyst L (TiO$_2$/SiO$_2$) | 74 | 21 | N.D |
| Ex. 16 | Catalyst M (Ti—V—Zr ternary oxide) | 45 | 9 | N.D |

The present application claims priority under 35 U.S.C. § 119 to Japanese Patent Application No.2003-307589 filed Aug. 29, 2003, entitled "METHOD OF PRODUCING FATTY ACID ESTERS", Japanese Patent Application No.2003-418666 filed Dec. 16, 2003, entitled "METHOD OF PRODUCING FATTY ACID ESTERS", Japanese Patent Application No.2003-421448 filed Dec. 18, 2003, entitled "METHOD OF PRODUCING FATTY ACID ESTERS, CATALYSTS AND DIESEL FUEL" and Japanese Patent Application No.2003-427471 filed Dec. 24, 2003, entitled "METHOD OF PRODUCING FATTY ACID LOWER

ALKYL ESTERS AND/OR GLYCERIN." The contents of those applications are incorporated herein by reference in their entirely.

The invention claimed is:

1. A method of producing fatty acid alkyl esters and/or glycerine by reacting a fat or oil with an alcohol using an insoluble solid catalyst in a reaction apparatus comprising at least one reactor, comprising:
   (a) obtaining low-boiling components removed liquid by removing low-boiling components or fraction from an effluent liquid of a reactor and
   (b) separating the fatty acid alkyl esters and glycerine from the low-boiling components removed liquid,
   wherein an eluted active metal component of the insoluble solid catalyst in the effluent liquid of a reactor amounts to a level not higher than 1,000 ppm; wherein the insoluble solid catalyst comprises a mixed oxide catalyst, which contains:
   as an essential component thereof, at least one metal element selected from the group consisting of the elements belonging to the Group 5 in the periodic table, and
   as a second component thereof, at least one element selected from the elements belonging to the Group 3, 6, 8, 9, 10, 11, 12, 14, 15 and the Group 16 in the periodic table and lanthanoid.

2. The method of producing the fatty acid alkyl esters and/or glycerine according to claim 1,
   wherein obtaining the low-boiling components removed liquid by removing the low-boiling components or fraction from the effluent liquid of a last reactor is carried out in the absence of the catalyst.

3. The method of producing the fatty acid alkyl esters and/or glycerine according to claim 1,
   wherein separating the fatty acid alkyl esters and glycerine from the low-boiling components removed liquid comprises phase separation of the low-boiling components removed liquid into an ester phase and a glycerine phase.

4. The method of producing the fatty acid alkyl esters and/or glycerine according to claim 1,
   which comprises reacting an ester phase separated from an effluent of a reactor with an alcohol in the next reactor in the presence of the insoluble solid catalyst.

5. The method of producing the fatty acid alkyl esters and/or glycerine according to claim 3,
   wherein the glycerine phase obtained in the phase separation of the low-boiling components removed liquid contains not less than 70 parts by weight of glycerine per 100 parts by weight of the glycerine phase.

6. The method of producing the fatty acid alkyl esters and/or glycerine according to claim 3 comprising
   purifying at least one of the ester phase and the glycerine phase obtained in the phase separation of the low-boiling components removed liquid by distillation,
   wherein at least one of the purification residues is used as one of the raw materials for the reaction.

7. The method of producing the fatty acid alkyl esters and/or glycerine according to claim 1,
   wherein the alcohol is recovered from the low-boiling components or fraction distilled off and at least part of the recovered alcohol is used as a raw material.

8. method of producing the fatty acid alkyl esters and/or glycerine according to claim 1,
   wherein the insoluble solid catalyst is a catalyst capable of catalyzing the esterification of free fatty acids contained in the fat or oil.

9. The method of producing the fatty acid alkyl esters and/or glycerine according to claim 1,
   wherein a fixed bed reaction apparatus packed with the insoluble solid catalyst is used for a production and
   the fatty acid alkyl esters and/or glycerine is produced continuously.

10. The method of producing the fatty acid alkyl esters and/or glycerine according to claim 1,
    wherein the insoluble solid catalyst comprises an oxide whose crystal is composed of an octahedral skeleton formed by coordination of the essential metal component with oxygen atoms in a six-coordinate complex-forming manner.

11. A method of producing the fatty acid alkyl esters and/or glycerine by reacting a fat or oil with an alcohol using an insoluble solid catalyst in a reaction apparatus comprising at least one reactor, comprising:
    (a) obtaining low-boiling components removed liquid by removing low-boiling components or fraction from an effluent liquid of a reactor and
    (b) separating the fatty acid alkyl esters and glycerine from the low-boiling components removed liquid,
    wherein an eluted active metal component of the insoluble solid catalyst in the effluent liquid of a reactor amounts to a level not higher than 1,000 ppm;
    wherein the insoluble solid catalyst comprises a layered compound represented by the following general formula (1):

$$ATi_xMO_{(2X+3)} \quad (1)$$

wherein A represents a hydrogen atom or an alkali metal atom, M represents a niobium atom or a tantalum atom and X is a natural number not greater than 7.

12. The method of producing the fatty acid alkyl esters and/or glycerine according to claim 2,
    wherein separating the fatty acid alkyl esters and glycerine from the low-boiling components removed liquid comprises phase separation of the low-boiling components removed liquid into an ester phase and a glycerine phase.

13. The method of producing the fatty acid alkyl esters and/or glycerine according to claim 2,
    which comprises reacting an ester phase separated from an effluent of a reactor with an alcohol in the next reactor in the presence of the insoluble solid catalyst.

14. The method of producing the fatty acid alkyl esters and/or glycerine according to claim 2,
    wherein the alcohol is recovered from the low-boiling components or fraction distilled off and at least part of the recovered alcohol is used as a raw material.

15. The method of producing the fatty acid alkyl esters and/or glycerine according to claim 2,
    wherein a fixed bed reaction apparatus packed with the insoluble solid catalyst is used for a production and
    the fatty acid alkyl esters and/or glycerine is produced continuously.

16. The method of producing the fatty acid alkyl esters and/or glycerine according to claim 10,
    wherein the octahedral skeleton comprises a layered oxide resulting from bonding of at least one pair of the octahedrons with at least one edge sharing.

17. The method of producing the fatty acid alkyl esters and/or glycerine according to claim 10,
    wherein the essential metal component is located at the center of each octahedron of the octahedral skeleton.

18. The method of producing the fatty acid alkyl esters and/or glycerine according to claim 1,
    wherein the mixed oxide catalyst is a crystallized form.

19. The method of producing the fatty acid alkyl esters and/or glycerine according to claim 1, wherein a ratio of the second component relative to the essential component is not less than 0.05 and not more than 10.

20. The method of producing the fatty acid alkyl esters and/or glycerine according to claim 1, wherein the mixed catalyst comprises at least one member selected from the group consisting of iron-vanadium mixed oxide, cobalt-vanadium mixed oxide, cerium-vanadium mixed oxide, molybdenum-niobium mixed oxide, molybdenum-tantalum mixed oxide, tungsten-niobium mixed oxide and tungsten-tantalum mixed oxide.

* * * * *